March 11, 1958 O. S. WILLIAMS 2,826,450
ATTACHED TRACTOR CABS
Filed Dec. 29, 1954 3 Sheets-Sheet 2

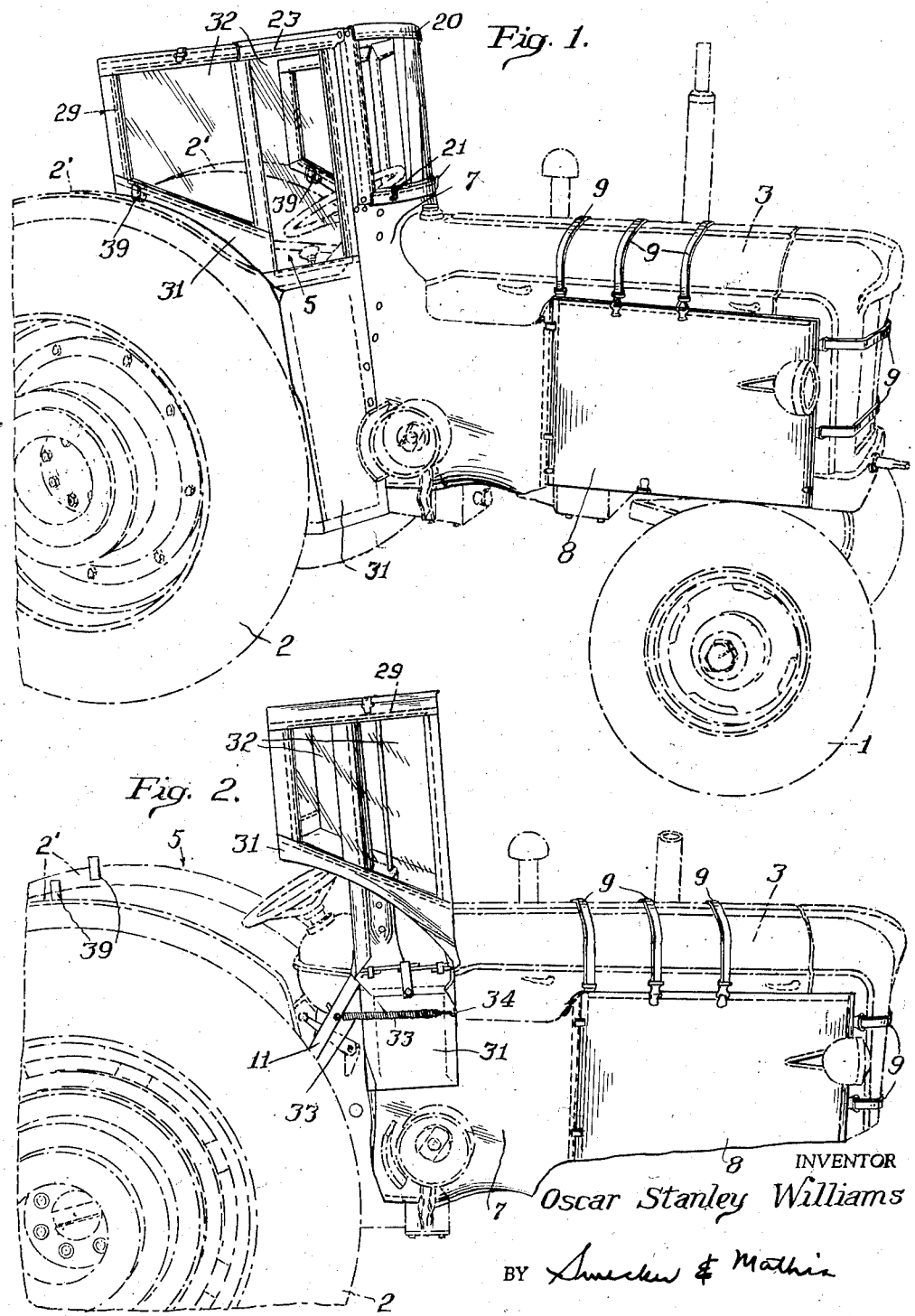

INVENTOR
Oscar Stanley Williams
BY
ATTORNEYS

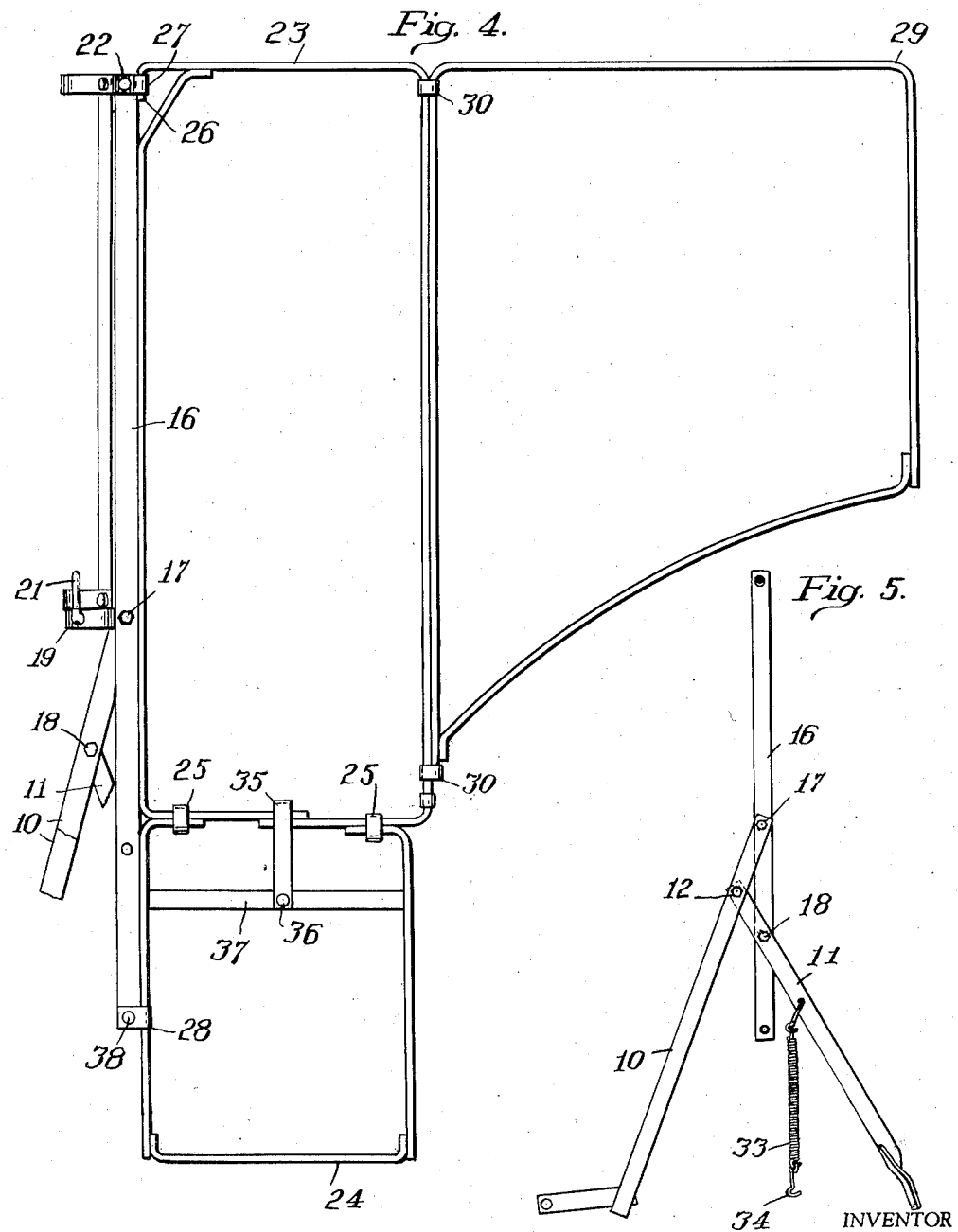

United States Patent Office 2,826,450
Patented Mar. 11, 1958

2,826,450

ATTACHED TRACTOR CABS

Oscar Stanley Williams, Arlington, Ind.

Application December 29, 1954, Serial No. 478,248

7 Claims. (Cl. 296—78)

This invention relates to improvements in tractor cabs of the character applied to farm tractors and the like for protecting the operator from the wind and for directing heat from the engine back to the enclosed operator's compartment.

Many tractors of the type described have provisions for entrance to and exit from the operator's seat and location at the front of the rear wheels of the tractor, usually around relatively small fenders provided over the wheels and between the latter and the operator's compartment. This is especially true where implements are mounted at the rear of the tractor or connected therewith so as to make difficult the entrance and exit of the operator at the rear.

With such tractors, the cabs or enclosures provided heretofore have been unsatisfactory and in many instances impractical for use, because they have not provided for a side entrance to or exit from the operator's compartment at the front of the rear wheels. In some instances, entrance ways have been provided which have left the structure insecure and have been subject to many disadvantages in service.

One object of this invention is to overcome the foregoing objections and to provide a practical and adequate tractor cab or enclosure which nevertheless will permit of ready entrance to and exit from the operator's compartment at the front thereof.

Another object of the invention is to simplify and improve the mounting structure for the enclosing material which will provide for at least a partial folding of the material in the form of a door at one or both opposite sides of the tractor at the front of the operator's compartment, whereby the structure may be mounted securely on the tractor, and yet provision is made for ready entrance to and exit from the operator's compartment at the front thereof.

Still another object of the invention is the provision of a frame structure that will securely support the enclosing material and yet may be folded for shipment thereof in a compact package that will reduce the shipping costs of the completed unit.

These objects may be accomplished according to one embodiment of the invention by the provision of side frame members adapted to be secured on opposite sides of the tractor at the front of the operator's compartment, with provisions for enclosing and supporting thereon the canvas enclosure that partly surrounds the engine of the tractor. Standards are connected with the frame members, both to suspend the the windshield therebetween and to act as supports for the foldable side enclosures that extend rearward on opposite sides of the operator's compartment. These side enclosures are hingedly supported and have the sections also hinged with respect to each other in order that they may be folded either to allow ready entrance of air into the front portions of the operator's compartment for additional cooling during hot weather, or for opening to permit exit or entrance of the operator, as desired.

This embodiment of the invention is illustrated in the acompanying drawings, in which:

Fig. 1 is a perspective view of a tractor, showing the improved tractor cab applied thereto, the tractor being illustrated in dotted lines;

Fig. 2 is a side elevation thereof, with the tractor cab partially folded relative to the tractor;

Fig. 4 is a side elevation of a part of the mounting frame structure; and

Fig. 5 is a similar view, showing an additional part of the mounting frame.

Figure 3:
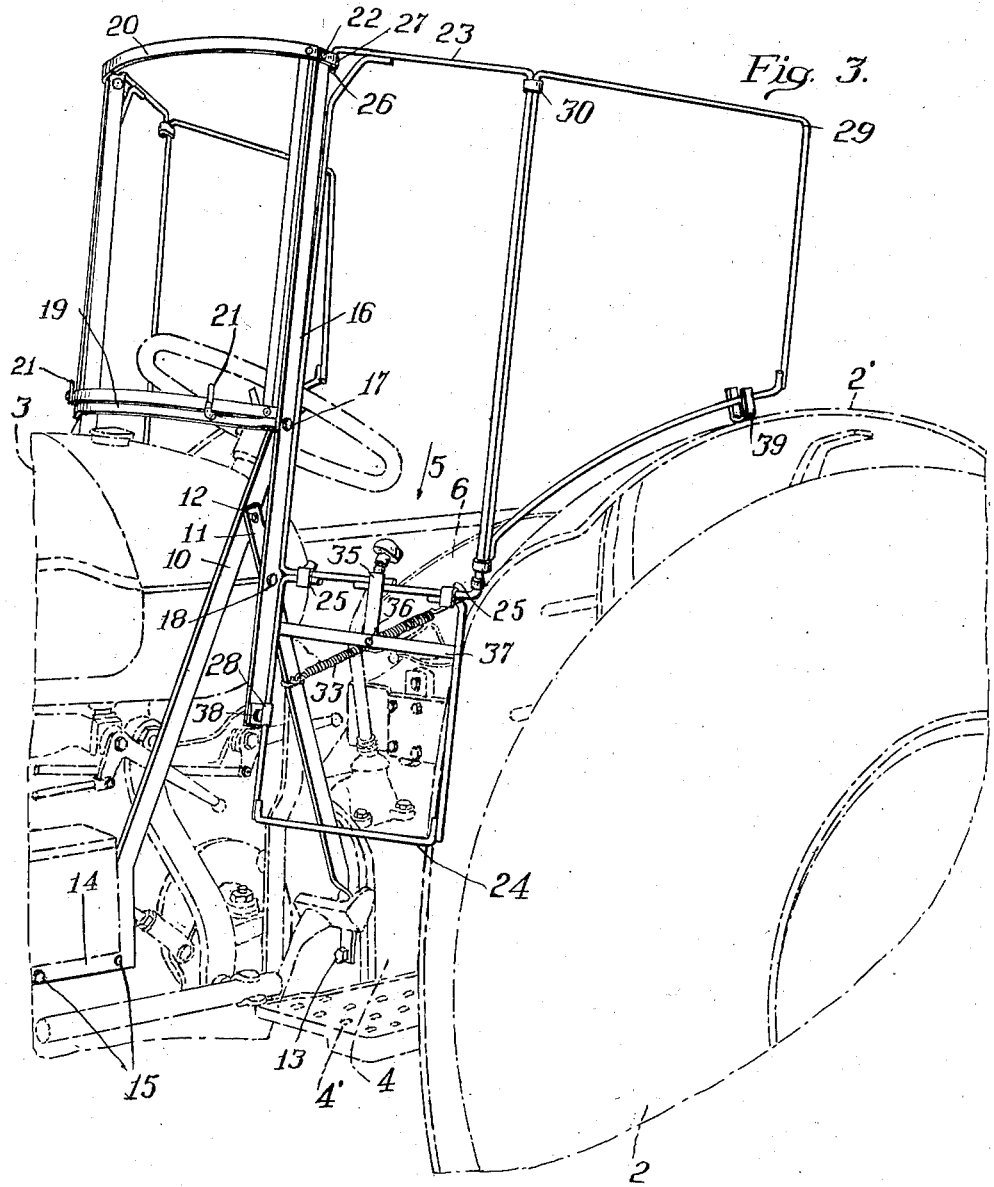
Fig. 3 is a perspective view at the opposite side from Fig. 1 and showing the mounting frame for the tractor cab.

In Figs. 1 to 3 is illustrated in dotted lines a conventional form of tractor of the type generally designated as a farm tractor, row crop or other suitable designation for a three wheel or four wheel tractor. The invention is applicable either to tractors of this type or to other suitable forms thereof which may be used in areas where protection for the operator may be desirable.

In the embodiment illustrated in the dotted lines in the drawings, the tractor is provided with the usual front and rear wheels, designated generally at 1 and 2, respectively, and having an engine 3 for driving the rear wheels through transmission structure, as illustrated at 4 in Fig. 3. Suitable controls are provided, located within the operator's compartment, indicated generally at 5, that is rearwardly of the engine 3 and between the opposite rear wheels 2. The operator may be located generally on a seat 6. When fenders are provided over the wheels, as indicated at 2', these often terminate short of the engine 3 to provide an entranceway therebetween. A step or floor is shown at 4' in Fig. 3.

The tractor cab usually is formed with a cowl portion 7 which extends across and down opposite sides of the engine 3 at the rear end thereof, enclosing the latter snugly. The opposite sides of the cowl portion 7 may be provided with side flaps 8 thereon which extend partially or fully to the front ends of the engine 3. These parts may be secured in place in any suitable manner, as by straps 9 that extend between the flaps 8 on opposite sides of the engine and around or over the adjacent portion of the latter.

The cowl section and side flaps usually are formed of canvas or other suitable material and may be used in accordance with this invention, or these and other parts of the enclosing portions of the cab may be formed of plastic, as desired.

The opposite sides of the cowl section 7 are mounted on upright supports secured to a convenient or adjacent portion of the tractor. Each of the supports preferably is formed of a pair of bars 10 and 11 extending downwardly in diverging relation to each other, being pivotally connected together by a bolt fastening 12. The bar 11 is thus secured by the bolt 12 to the upper end of the bar 10, while its lower end is secured in suitable manner, as by an attaching bolt or screw 13, to a convenient part of the tractor, such as the housing of the transmission 4, to brace and support the support bar 11 at the lower end of the latter. The lower end of the support bar 10 is also attached by suitable fastenings, such as bolts and screws 15, to a convenient part of the tractor, such as the frame that encloses the engine 3.

In the embodiment illustrated in Fig. 3, the bar 10 has an offset portion, generally indicated at 14, to clear a part of the tractor, in this instance a tool box, on one side thereof. The opposite corresponding bar 10 may be straight throughout its length, or otherwise varied according to the mountings on the tractor. These bars 10 and 11 may be varied in shape to conform to the parts of the tractor to which they are to be applied and secured and to clear obstructions provided thereon.

The support bar 10 extends upward to a point above the upper end of the support bar 11, as will be apparent from Fig. 5. A standard 16 is pivotally connected by means of a bolt 17 with the upper end of the support bar 10 and extends above and below the point of attachment thereto. The standard 16 is also connected by a bolt 18, with the support bar 11 intermediate the length thereof and adjacent the bolted connection 12. While I have described and preferably use bolts for most of these connections, to facilitate fastening of the parts together and removability when desired, it is recognized that other forms of fastenings may be used in place of bolts, such as rivets, which may or may not permit of pivoting actions. In this embodiment, the bolt 17 is adapted for removal in folding the frame for shipment and may be applied whenever the frame is to be set up or attached to the tractor.

Extending transversely between the upper end portions of the side supports is a crossbar 19, the opposite ends of which are detachably secured to the respective supports as, for example, by the fastening bolts 17. The canvas or other suitable covering material forming the cowl portion 7 may be secured to the crossbar 19 by a hem or otherwise to support the cow' portion at the front of the operator's compartment.

A windshield is indicated generally at 20 extending transversely between the upright standards 16. The windshield is formed usually of transparent plastic material supported by a surrounding frame. Any suitable form of windshield may be used as desired. The windshield is shown as anchored by fastenings 21 at the lower edge thereof, carried by the crossbar 19, and the upper edge of the windshield may be connected to the upper ends of the standards 16 by suitable clips or other fastenings, generally indicated at 22, which may be bolted or otherwise secured to the windshield frame or to the standards for detachment of the parts.

Foldable side sections are mounted upon and connected with the standards 16 to form side wing portions on the cab and to provide continuations for opposite sides of the cowl section 7. These may be folded, as will be evident by comparison of Figs. 1 and 2, to permit access to the operator's compartment 5 at either opposite side thereof over the step 4', or to allow air circulation thereto.

Each side wing portion is shown as formed of a pair of frames hingedly connected to each other and to the adjacent standard 16. These frames may be formed of wire rods or of other suitable material sufficiently rigid, and yet preferably not of appreciable weight, to support the covering material applied thereto.

One of the frame sections is designated at 23, being substantially rectangular in outline, having the wire rods bent to the required shape and welded or otherwise secured together. At the lower end of the frame section 23 is a second frame section 24, also formed of rods and forming a continuation of the section 23 in this example, according to the size and spacing of the entrance or exit area of the tractor over the step 4'.

These parts may be formed in one piece, if desired, but if formed of separate pieces, may be secured together by suitable clip fastenings 25, preferably pivotally, to permit swinging and folding of the section 24 upon and relative to the section 23, during shipment when the parts are folded. A lug 35 is preferably welded or otherwise secured rigidly to the frame 23, and, when the parts are opened and assembled in the relation shown in Fig. 4, the lug 35 may be secured by a bolt 36 to a crossbar 37 on the frame 24. This holds the frame 24 rigidly in alignment with the frame 23.

The section 23 is provided with a downturned pintle 26 which extends through an eye 27 in the clip fastening 22 at the upper end of the standard 16. This forms a pivotal or hinged connection between the frame section 23 and the standard. Another pivotal connection is provided between the frame section 24 and the lower end portion of the standard 16, as by means of a clip 28 at one side of the standard forming an eye through which a side of the frame section 24 extends. The clip 28 is secured by a bolt 38 to the standard 16, which bolt can be inserted and the parts secured rigidly when the frame structure is assembled for application to a tractor.

Thus, the sections 23 and 24, together, are hinged relative to the adjacent standard 16 and, being of substantially the same width as the entrance or exit space over the step 4', the joint swinging of these sections enables the operator to leave or enter the operator space 5, and when drawn across the space, as shown in Fig. 1, will substantially enclose the operator's compartment at that point.

A frame section 29, also formed of wire rods or other suitable material, is supported upon the section 23 and shaped to extend rearwardly over the rear wheels 2 or the fenders 2' to enclose the operator's compartment at the adjacent side thereof. The frame section 29 is pivoted or hinged at 30 with the adjacent side of the frame section 23, as by flat metal strips forming enclosing clips or eyelets extending around the adjacent side of one of the frame sections and secured to the other.

These frame sections 23—29 may be covered with any suitable covering material, such as canvas, plastic or the like, generally as indicated at 31 in Figs. 1 and 2, as by means of hems, detachable snap fastenings, or other suitable connecting means. A portion of each foldable door section covering material may hang loosely below the frame section 24 when closed over the step plate 4', as shown in Fig. 1, or folded up over said section and held in place, as shown in Fig. 2. Portions of the covering material may be transparent and thus form windows, as indicated at 32 in Figs. 1 and 2.

The frame sections 23—29 may be folded with respect to each other, and separated from the side supports 10—16 for packaging and shipping. The clip fastenings 27 and 28 enable these side wing portions to be attached readily to the standards 16 in assembling the tractor cab on the tractor. Upon removal of the bolts or other fastenings 17 and 38, for each of the supports 10—16, the parts of the latter may be folded into substantially flat relationship, very compact with respect to each other to facilitate packaging.

When opened to the relation shown in Fig. 3, these parts may be secured on the tractor, as by attaching the fastenings 13 and 14, and when the crossbar 19 is in place between the opposite supports, the attachment of the bolts 17 therein will not only anchor the parts of each support together, but these will be connected together across the top of the tractor in a substantially rigid frame. The other parts may be assembled in like manner, as will be obvious from the foregoing description.

The tractor cab may be removed when desired, as, for instance, during summer weather when it is not required, although for warm days in the spring and fall operations, the side wings may be folded upon themselves into substantially parallel relation at opposite sides of the windshield and cowl section 7, as illustrated in Fig. 2, to expose the front of the operator's compartment 5 to free circulation of air therethrough.

Then, during the early morning and evening operations, or during cold weather, when it is desired to utilize the heat of the engine for the comfort of the operator, it is a simple matter to draw these folded side wing portions backward along the opposite sides of the operator's compartment 5, substantially in the relation shown in Fig. 1. U-shaped clips 39 are secured on the fenders 2' in positions to receive the lower edges of the side wing sections 29 when the latter are pulled rearwardly in the relation shown in Fig. 1.

Coiled springs 33 may be used, if desired, to hold the sections 23—24 in closed relation. Each spring is anchored at one end to the support bar 11, and extends therefrom, with a hook 34 on the opposite end thereof for engagement with the opposite or rearward edge of the frame section 24, as illustrated in Fig. 3. When the sections are folded, as shown in Fig. 2, the hook 34 on the spring 33 may be engaged with the outer edge of the section 24, tending to hold these sections in folded positions.

The construction described utilizes a simple frame structure which may be disconnected to provide a compact assembly for shipment. However, the parts may be secured readily together by the average farmer or attendant setting up and mounting the tractor cab, and when in place on the tractor will hold the tractor cover securely. At the same time, it permits of ready entrance and exit of the operator at either side of the operator's compartment at the front thereof, and increases the flexibility of the structure inasmuch as it may be opened to permit front entrance of air thereto, or closed to protect the operator.

While the invention has been described and illustrated in one embodiment, it is recognized that variations and changes may be made therein without departing from the invention, as set forth in the claims.

I claim:

1. In a tractor cab, supporting standards adapted to be mounted on opposite sides of a tractor and to support covering material thereon, means connecting said supporting standards together and extending transversely therebetween adapted to extend over at least a portion of the tractor and to hold the top of the covering material in place, frame sections adjacent each of the supporting standards, means hingedly connecting one of the sections with the adjacent supporting standard, means hingedly connecting another of the frame sections with the first-mentioned frame section, and a frame section forming an extension on the lower end of the first-mentioned frame section and hinged thereon for raising movement with respect thereto.

2. In a tractor cab, supporting standards adapted to be mounted on opposite sides of a tractor and to support covering material thereon, means extending transversely between the supporting standards and connecting the same together and adapted to hold the covering material over at least a portion of the tractor, each of the supporting standards including an upright pair of arms extending downwardly in diverging relation, means connecting the arms together, means connecting the respective arms to the standard at points spaced from each other along the standard and spaced from the point of connection of the arms with each other, and means for connecting the lower ends of the respective arms with the tractor.

3. In a tractor cab, supporting structures adapted to be mounted on opposite sides of a tractor and to support covering material thereon, means extending transversely between the supporting structures and connecting the same together and adapted to hold the covering material over at least a portion of the tractor, each of the supporting structures including an upright standard and a pair of arms extending downwardly in diverging relation, means pivotally connecting the arms together at a point intermediate the length of one of the arms, means pivotally connecting the other arm with the standard, and means forming a detachable connection of said one of the arms with the standard at a point spaced from the point of connection of the second arm therewith, whereby each supporting structure may be folded into compact assembly with the arms substantially parallel with each other and with the standard for shipment.

4. In a tractor cab, supporting structures adapted to be mounted on opposite sides of a tractor and to support covering material thereon, means extending transversely between the supporting structures and connecting the same together and adapted to hold the covering material over at least a portion of the tractor, each of the supporting structures including an upright standard and a pair of arms extending downwardly in diverging relation, means pivotally connecting the arms together at a point intermediate the length of one of the arms, means pivotally connecting the other arm with the standard, and means forming a detachable connection of said one of the arms with the standard at a point spaced from the point of connection of the second arm therewith, said connections of the arms with the standard holding the standard securely braced in upright position, and the detachable connection being removable for folding of the arms relative to the standard, whereby each supporting structure may be folded into compact assembly with the arms substantially parallel with each other and with the standard for shipment.

5. In a tractor cab, a frame structure comprising supporting standards adapted to be mounted on opposite sides of a tractor, means connecting said standards together and extending transversely therebetween adapted to extend over a portion of the tractor to hold covering material in place thereon, a frame beside one of the standards, hinge means connecting the frame with said standard, a frame section forming an extension on one end of said frame, and means forming a hinged connection between said frame section and the frame for folding said section over said frame in compact assembly during transportation.

6. In a tractor cab, a frame structure comprising supporting standards adapted to be mounted on opposite sides of a tractor, means connecting said standards together and extending transversely therebetween adapted to extend over a portion of the tractor to hold covering material in place thereon, a frame beside one of the standards, hinge means connecting the frame with said standard, a frame section forming an extension on one end of said frame, and means forming a hinged connnection between said frame section and the standard for swinging movement with the frame relative thereto.

7. In a tractor having an engine, wheeled supporting means with fenders for the wheels, a frame structure extending over the engine adapted to support covering material, a door hinged at one edge to the frame structure and extending laterally therefrom, a second door hinged to the first door and carried thereby, and a U-shaped clip mounted on one of the fenders and having upright spaced members in positions to embrace opposite sides of the lower edge of the second door when extended over the fender to hold said doors in place.

References Cited in the file of this patent

UNITED STATES PATENTS

| 1,439,621 | Evans | Dec. 19, 1922 |
| 1,465,712 | Hanson | Aug. 21, 1923 |
| 1,609,207 | Schlabaugh | Nov. 30, 1926 |
| 2,423,748 | Acheson | July 8, 1947 |
| 2,460,399 | Schassberger | Feb. 1, 1949 |
| 2,698,060 | Burch | Dec. 28, 1954 |

OTHER REFERENCES

Montgomery Ward—Farm Equipment Catalog—Fall Supplement 1948, pages 36 and 37, featuring "all weather tractor cabs."